Jan. 4, 1949.                F. E. FREY                2,457,882
                         HYDRATION OF OLEFINS
                         Filed Oct. 17, 1944

INVENTOR
F. E. FREY
BY Hudson & Young
ATTORNEYS

Patented Jan. 4, 1949

2,457,882

UNITED STATES PATENT OFFICE 2,457,882

HYDRATION OF OLEFINS

Frederick E. Frey, Bartlesville, Okla., assignor to Phillips Petroleum Company, a corporation of Delaware Application October 17, 1944, Serial No. 559,115

10 Claims. (Cl. 260—640)

This invention relates to the preparation of alcohols by hydration of olefins and more particularly to preparation of such alcohols by hydration of olefins by the combined action of hydrogen fluoride and water.

This patent application is a continuation-in-part of my copending application for Hydration of olefins, Serial Number 521,833, filed February 10, 1944.

The principal object of the present invention is to provide an improved method of hydrating aliphatic olefins to the corresponding alcohols. Another object is to provide a method of accomplishing such hydration smoothly and with a minimum of the objectionable effects noted when the conventional hydrating acid, sulfuric acid, is employed, such as polymerization, decomposition, etc. Another object is to provide a method of the foregoing type wherein the acid functions as a true catalyst for the hydration and is reusable over and over again. Still another object of this invention is to provide a method of the foregoing type wherein a high yield of alcohol is produced in a short contact time by the hydration of olefins to alcohols using hydrogen fluoride as a catalyst in the presence of an inorganic fluoride promoter.

In the present invention the hydration of olefins to alcohols is greatly accelerated by use of hydrogen fluoride as a catalyst in the presence of an inorganic fluoride promoter. Suitable promoters are nickel fluoride, aluminum fluoride, calcium fluoride, strontium fluoride, potassium fluoborate, potassium tantalum fluoride, hydrofluoboric acid, and boron trifluoride.

Figure 1:
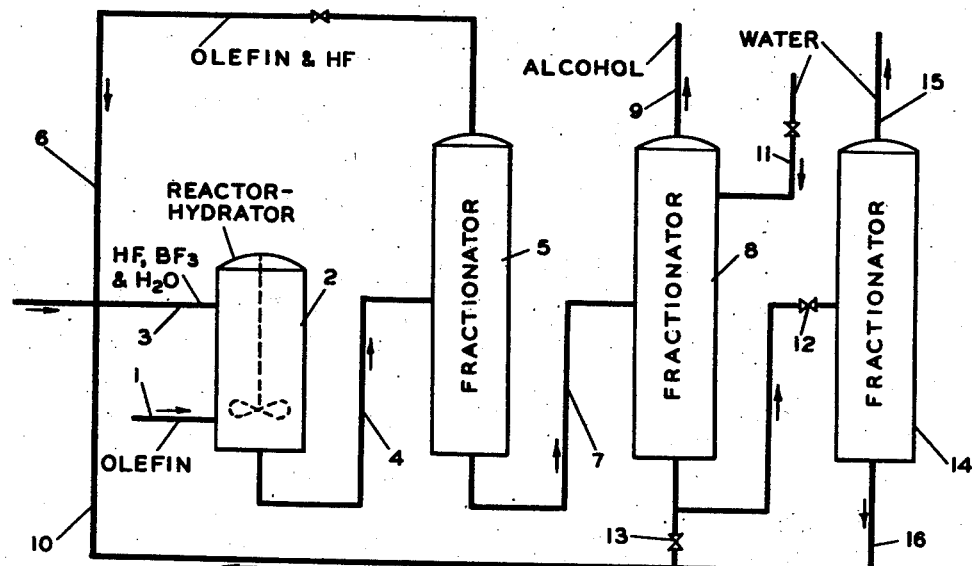
Figure 2:
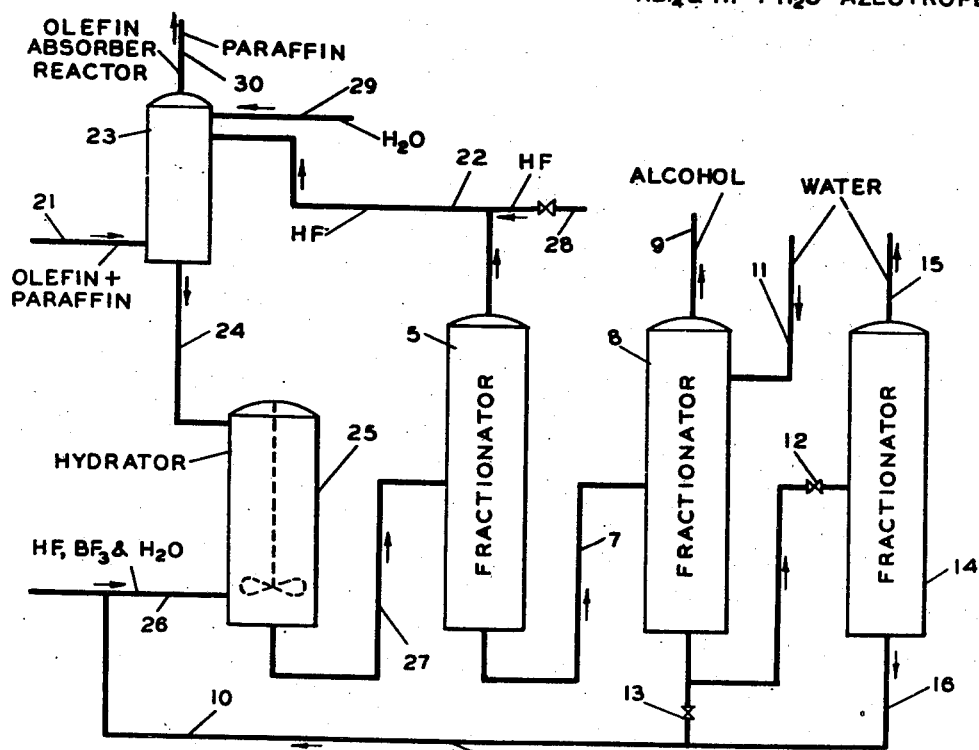

The accompanying drawing portrays diagrammatically two arrangements of equipment which can be used in carrying out this invention; Fig. 1 shows an arrangement wherein the postulated reaction between the olefin and HF to form the alkyl fluoride and hydration of the fluoride to the alcohol take place simultaneously; Fig. 2 shows preliminary formation of the alkyl fluoride and hydration thereof to the corresponding alcohol in a separate unit.

In accordance with the present invention, hydration of aliphatic olefins to the corresponding alcohols is effected by the combined action of hydrogen fluoride, an inorganic fluoride, and water. The olefin may be subjected to the simultaneous action of hydrogen fluoride and water in the presence of the inorganic fluoride promoter under such conditions that the alcohol is the principal reaction product. Alternatively, the olefin may be reacted with hydrogen fluoride, usually under anhydrous or nearly anhydrous conditions, whereby the alkyl fluoride is substantially the sole reaction product, and the fluoride so produced may be subsequently reacted with water in the presence of free hydrogen fluoride and an inorganic fluoride promoter to effect conversion to the alcohol. Under some conditions, the olefin may be contacted with hydrogen fluoride and water in such amounts and under such conditions that the olefin is converted partly to the alcohol and partly to the fluoride. The reaction mixture so produced may be further treated to convert the fluoride contained therein to the alcohol, or the fluoride content may be recovered in any suitable way and separately converted to the alcohol by means of water as a hydrating agent in the presence of free hydrogen fluoride and an inorganic fluoride promoter.

The alcohol is recovered from the reaction product in any suitable manner. A convenient method is to subject the reaction effluent to fractional distillation in a suitable fractionation system. For example, the effluent may be fractionally distilled in a first fractionator to recover an anhydrous overhead fraction comprising any excess of hydrogen fluoride over the constant-boiling proportion and a heavy fraction of the alcohol and a constant-boiling mixture of water and hydrogen fluoride, the latter fraction being fractionally distilled in a second fractionator to separate the alcohol from the constant-boiling mixture of water and hydrogen fluoride. I have found in some cases that the alcohol is not sharply separated as an overhead product following elimination of what hydrogen fluoride is recoverable with little contamination beforehand, and dilution with water will cause a sharp separation. Such added water can be partly or wholly eliminated as such in a subsequent distillation step. The hydrogen fluoride and the azeotrope are recycled to appropriate points in the alcohol-forming system.

The invention is applicable to the hydration of aliphatic olefins, usually the lower aliphatic olefins and frequently the olefins having from 2 to 5 carbon atoms; namely, ethylene, propylene, butene-1, butenes-2, isobutylene and the various amylenes. The olefin may be in admixture with other hydrocarbons, usually paraffins, which are inert.

In its usual form, the process of the present invention involves effecting hydration of olefins to alcohols by aqueous hydrofluoric acid as a hydrating medium or catalyst in the presence of an inorganic fluoride promoter. Hydrofluoric acid having a concentration in the range of about 10 to 70 per cent or higher is effective. Solutions of 40 to 50 per cent are generally preferred. The optimum concentration varies with other conditions of the hydration and for any particular case may be readily determined by trial or by a consideration of the reaction temperature and the olefin species. The temperature ordinarily varies within the range of 0° C. to 300° C., but it may be outside this range in particular cases. The pressure is not especially critical and depends upon the temperature and upon the olefin. The pressure may be such that olefin is in either gaseous or liquid phase.

The process of the invention may be carried out in either batchwise manner or continuously. In batch-type operation, the olefin, hydrofluoric acid, and inorganic fluoride promoter are passed into a suitable reaction vessel, and the mixture is thoroughly agitated and maintained at suitable temperature and pressure until the reaction is substantially complete. At the close of the reaction period, the liquid is withdrawn, and the alcohol is separated and concentrated, as by fractional distillation.

In continuous hydration, the olefin or an olefin-containing gaseous mixture is dispersed in the hydrating liquid in any suitable reaction vessel, for example, by contacting the gas countercurrently with the liquid. After a suitable reaction time, the liquid is withdrawn from the reactor, and the alcohol is separated from the hydrating liquid by suitable means. The alcohol may be concentrated or purified and is withdrawn as a product of the process, and the hydrating acid and promoter are recycled to the reactor.

The preferred temperature ranges from 75 to 300° C. By use of elevated temperature and pressure, the reaction can be accelerated, and the yield can be improved. In the hydration of ethylene, the preferred temperature is within the range of 200 to 300° C. When the olefin is preliminarily absorbed in the acid, concentrations of hydrogen fluoride above the approximately 40 per cent figure for the azeotrope are employed, ranging up to 70 per cent or even up to 95 per cent or higher, up to the anhydrous form; the hydration of the olefin or of the fluoride is then conducted with lower acid strengths. After the hydrolysis, any unreacted olefin and/or unhydrolyzed alkyl fluoride may be removed from the reaction mixture in a first fractional distillation zone, and may be recycled to the hydrolysis step, accompanied in some instances by some hydrogen fluoride and promoter. A second fractional distillation separates the azeotrope of hydrogen fluoride and water from the alcohol, the azeotrope being recycled to the hydrolysis step and the alcohol being withdrawn as a product of the process. When the alcohol itself forms an azeotrope, as with hydrogen fluoride, or with hydrogen fluoride and water, additional steps or other modifications to be described may be practiced in order to obtain the alcohol in substantially pure form.

With tertiary base olefins such as isobutylene and isoamylene, relatively lower acid strengths (constant-boiling or weaker) are optimum for the hydrofluorination step, and accordingly the fractionation or recovery process may consist of only one fractional distillation zone. Water, the azeotrope, or the alcohol may be the first to be distilled overhead, depending upon the proportions and the boiling points of these various components under the conditions prevalent in the distillation zone. By "constant-boiling" I refer to the constant-boiling mixture of hydrogen fluoride and water at atmospheric pressure.

When hydrofluorination of the olefin is followed by hydrolysis of the fluoride in a separate step, the olefin and the hydrogen fluoride react rapidly at ordinary or slightly elevated temperatures to give the alkyl fluoride without excessive polymerization, especially in the absence of a heavy layer of acid. To prevent excessive formation of polymers in either step, the hydrogen fluoride is preferably limited to between about one and about ten times that required stoichiometrically for the hydrofluorination of the olefin. For most olefins, a mol ratio of hydrogen fluoride to olefin of about 4:1, or slightly more, is a good over-all choice. When it is desired to absorb olefin selectively from undesired inert diluents, hydrogen fluoride may be used as absorption liquid in the presence of a little water to retard polymerization, and if water or highly aqueous hydrogen fluoride is brought into contact with inert effluent first it performs the additional function of recovering hydrogen fluoride carried away from the olefin-absorption step.

Alternatively, the hydrofluorination of the olefin may be conducted in the same way as the first step of the processes disclosed in my copending applications, Serial No. 429,962, filed February 7, 1942, now Patent 2,384,735 issued September 11, 1945, and Serial No. 433,204, filed March 3, 1942, now Patent 2,384,736, issued September 11, 1945. In the first mentioned application, a liquid hydrocarbon material containing low-boiling olefins to be reacted and undesired inert hydrocarbons is contacted with liquid concentrated hydrogen fluoride at a temperature ranging from 30 to 150° F. (0 to 66° C.) and with a ratio of HF to olefin by weight between about 10:1 and 50:1 to dissolve the olefins in the hydrofluoric acid, whereupon the hydrofluoric acid phase is separated. This contains the olefin as the alkyl fluoride, which is then hydrolyzed in accordance with the present invention. In the second application, the extraction of the olefin is conducted with the olefin-containing hydrocarbon stream in gaseous phase.

The molar ratio of hydrogen fluoride to olefin employed in carrying out the present invention may vary within wide limits. Usually it will lie within the range of 0.5 to 10. Ordinarily, for complete reaction it is preferred that this ratio be greater than 1.

In the following detailed description of specific aspects of the process, as illustrated by the accompanying drawing, a specific promoter will be used. While boron trifluoride is specified as said promoter throughout this detailed description, it is to be understood that the other inorganic fluoride promoters may be used.

Referring to Fig. 1 of the drawing, the olefin containing feed enters reactor-hydrator 2 via line 1. Hydrogen fluoride, boron trifluoride and water in the proper proportions and amounts are fed via line 3. The olefin is intimately contacted with the water and hydrogen fluoride in the presence of boron fluoride as promoter. The reaction effluent passes via line 4 to fractionator 5, where hydrogen fluoride in excess of the amount required to form an azeotrope with water, together with unreacted olefin is taken overhead and recycled through line 6. The bottom product comprising alcohol, the azeotrope of hydrogen fluoride with water and fluoboric acid formed from the boron trifluoride and hydrogen fluoride pass via line 7 to fractionator 8 where the alcohol is taken off at one point depending upon its boiling point, as overhead via line 9, while the azeotrope and fluoboric acid are taken off at another point, for example, as bottom product via valve 13 and line 10 for recycle. In cases where strong acid suppresses the preferential vaporization of the alcohol in fractionator 8, water may be introduced through valve 11 to cause the alcohol to distill overhead. With valve 12 open and valve 13 closed, elimination of such added water may be effected by fractionator 14. When fractionator 14 is used, the water is taken overhead via line 15 and the azeotrope and fluoboric acid form the bottom product which leaves via line 16. It will be understood that the fractionation is shown purely diagrammatically and that suitable provision is made for transfer of fluids, refluxing and reboiling, removal of any inert hydrocarbons in the olefin feed, removal of heavy materials formed in the reaction, etc.

In Fig. 2, the olefin and hydrogen fluoride are fed via lines 21 and 22, respectively, to absorber reactor 23. The hydrogen fluoride reacts selectively with the olefin to form the corresponding alkyl fluoride. The resulting alkyl fluoride-containing mixture passes via line 24 to hydrator 25, whereinto water free hydrogen fluoride and an inorganic fluoride promoter are introduced via line 26 as required. The reaction mixture thus formed passes via line 27 to a fractionation system as in Fig. 1. Fresh hydrogen fluoride may be supplied to line 22 via line 28 as desired.

Water may be introduced through line 29 to prevent loss of hydrogen fluoride with paraffins or other diluents discharged through pipe 30. Such water retards polymerization, but should not be added in so great amount as to drive alkyl fluorides out of solution, for which reason only one part of water for four to twenty parts of hydrogen fluoride in the absorber is permissible.

The following specific examples illustrate the practice of the present invention as applied to the hydration of olefins. These examples illustrate the use of inorganic fluoride promoters and indicate the relative activities of the promoters.

SPECIFIC EXAMPLES

The following procedure was used in carrying out the hydration of olefins with hydrogen fluoride as a catalyst in the presence of an inorganic fluoride promoter. A monel bomb was charged with hydrogen fluoride and a promoter. The bomb was clamped to a platform rocker and was fitted with a suitable pressure gauge. The bomb was rocked and was heated to a given reaction temperature. At the reaction temperature, rocking was stopped, and the olefin was charged. Rocking was then resumed and was allowed to continue for a given contact time. The temperature and the pressure were recorded every five minutes. At the end of the contact time, rocking was stopped, and the reaction mixture was immediately discharged through cooling coils into a copper container. The reaction mixture was then fractionated to recover alcohol.

The promoter effect of a given substance was determined by correlating the alcohol yield with the rate of pressure decay.

The results obtained with various inorganic fluoride promoters are shown in Table I. In each of the examples the charge used was substantially the same and consisted of:

1. 520 grams of 38 per cent aqueous hydrofluoric acid
2. 20–25 grams of promoter
3. 12–20 grams of ethylene.

The pressure decay rate was determined by subtracting the final pressure reading from the pressure reading recorded immediately after charging the ethylene, and dividing the resulting value for the total pressure decrease by the contact time.

TABLE I

Promoters for the reaction between ethylene and aqueous hydrofluoric acid

| Example No. | Promoter | Pressure after charging ethylene, p.s.i. | Temperature after charging ethylene | | Contact time, min. | Final pressure, p.s.i. | Final temp. | | Pressure decay p.s.i./min. |
|---|---|---|---|---|---|---|---|---|---|
| | | | °C. | °F. | | | °C. | °F. | |
| 1 | None | 800 | 238 | 460 | 15 | 750 | 245 | 473 | 3.3 |
| 2 | NiF$_2$ | 770 | 238 | 460 | 15 | 735 | 242 | 468 | 1 2.3 |
| 3 | Al$_2$F$_6$ | 750 | 238 | 460 | 15 | 695 | 243 | 469 | 3.7 |
| 4 | CaF$_2$ | 760 | 240 | 464 | 15 | 700 | 245 | 473 | 4.0 |
| 5 | SrF$_2$ | 770 | 238 | 460 | 15 | 700 | 245 | 473 | 4.7 |
| 6 | KBF$_4$ | 740 | 241 | 466 | 15 | 660 | 244 | 471 | 5.3 |
| 7 | K$_2$TaF$_7$ | 810 | 238 | 460 | 15 | 725 | 244 | 471 | 5.7 |
| 8 | BF$_3$ | 900 | 238 | 460 | 15 | 735 | 243 | 469 | 11.0 |

[1] The low pressure decay rate for nickel fluoride is probably to be explained by the presence of hydrogen-forming materials in the material that was used. Evidence of such impurities was shown by the vapor pressure of the acid-catalyst mixture which was about 60 p.s.i. higher than that obtained for similar acid-catalyst mixtures at the same temperature.

The pressure decay rate is indicative of the relative activity of the promoter. Table II shows the effect of varying contact times on yield. Examples 1, 7, and 8 are repeated in Table II for comparison.

TABLE II

*BF₃ as a promoter for the reaction between ethylene and aqueous hydrofluoric acid*

| Example No. | 1 | 7 | 8 | 9 | 10 | 11 | 12 |
|---|---|---|---|---|---|---|---|
| Promoter | None | K₂TaF₇ | BF₃ | BF₃ | BF₃ | BF₃ | BF₃ |
| Charge: | | | | | | | |
| Promoter, g | | 25 | 21.3 | 55.8 | 26.3 | 22.2 | 18.6 |
| 38% HF, g | 520 | 520 | 520 | 520 | 520 | 520 | 520 |
| Ethylene, g | 16.8 | 17.3 | 19.1 | 15.4 | 18.2 | 15.9 | 18.2 |
| Initial pressure, p. s. i | 800 | 810 | 900 | 850 | 950 | 900 | 930 |
| Initial temperature: | | | | | | | |
| °C | 238 | 238 | 238 | 240 | 238 | 241 | 238 |
| °F | 460 | 460 | 460 | 464 | 460 | 466 | 460 |
| Contact time, min | 15 | 15 | 15 | 15 | 5 | 10 | 15 |
| Rate of pressure decay, p. s. i./ min., after— | | | | | | | |
| 5 min | 4 | 8 | 24 | 28 | 27 | 32 | 26 |
| 10 min | 4 | 6 | 15 | 12 | | 20 | 17 |
| 15 min | 3 | 6 | 11 | 7 | | | 12 |
| Final pressure, p. s. i | 750 | 725 | 735 | 750 | 815 | 700 | 755 |
| Final temperature: | | | | | | | |
| °C | 245 | 244 | 243 | 245 | 240 | 243 | 242 |
| °F | 473 | 471 | 469 | 473 | 464 | 469 | 468 |
| Discharge time, min | 8 | 5.5 | 5.0 | (1) | 4.5 | 4.8 | |
| Alcohol yield, percent of theor.[2] | 23 | 26 | 38 | 34 | 24 | 38 | (3) |

[1] Because of a clogged line, the reaction mixture was not discharged immediately, but was allowed to cool overnight before it was removed.
[2] The alcohol boiled at 77–80° C. (171–176° F.). Although the alcohol possessed a diethyl ether odor, no evidence of the presence of diethyl ether was observed during the fractionation.
[3] A leaky valve in the fractionating column caused some loss and prevented getting a value for the yield of alcohol.

From the foregoing examples it is evident that boron trifluoride is superior to the other inorganic fluorides as a promoter. Example 9 shows that an excess of promoter has little if any effect on either the rate of reaction or ultimate yield.

It will be understood that the foregoing examples are primarily illustrative only and that the conditions used in them should not be applied in an unduly limitative manner. Since the invention may be practiced otherwise than as specifically described, and since many modifications and variations of it will be apparent to those skilled in the art, this invention should be limited only in accordance with the appended claims.

I claim:

1. The process of converting ethylene to ethyl alcohol, which comprises subjecting ethylene to the action of an aqueous solution consisting of hydrogen fluoride and boron trifluoride dissolved in water, the weight of hydrogen fluoride being 10 to 50 per cent by weight of the total hydrogen fluoride and water and the weight of boron fluoride being minor with respect to the hydrogen fluoride, with the molar ratio of hydrogen fluoride to olefin greater than 1 and not greater than 10, at a reaction temperature between 200 and 300° C. and a sufficient superatmospheric pressure to maintain said aqueous solution in liquid phase, for a reaction period between 5 and 15 minutes, and recovering ethyl alcohol so produced.

2. The process of converting ethylene to ethyl alcohol, which comprises subjecting ethylene to the action of an aqueous solution consisting of hydrogen fluoride and an inorganic fluoride promoter selected from the group consisting of nickel fluoride, aluminum fluoride, calcium fluoride, strontium fluoride, potassium fluorborate, potassium tantalum fluoride, hydrofluoboric acid, and boron trifluoride dissolved in water, the weight of hydrogen fluoride being 10 to 50 per cent by weight of the total hydrogen fluoride and water and the weight of said inorganic fluoride promoter being minor with respect to the hydrogen fluoride, with the molar ratio of hydrogen fluoride to olefin greater than 1 and not greater than 10, at a reaction temperature between 200 and 300° C. and a sufficient superatmospheric pressure to maintain said aqueous solution in liquid phase, for a reaction period between 5 and 15 minutes, and recovering ethyl alcohol so produced.

3. The process of preparing an aliphatic alcohol, which comprises subjecting the corresponding olefin to the action of an aqueous solution consisting of hydrogen fluoride and an inorganic fluoride promoter selected from the group consisting of nickel fluoride, aluminum fluoride, calcium fluoride, strontium fluoride, potassium fluoborate, potassium tantalum fluoride, hydrofluoboric acid, and boron trifluoride dissolved in water, the weight of hydrogen fluoride being 10 to 50 per cent by weight of the total hydrogen fluoride and water and the weight of said inorganic fluoride promoter being minor with respect to the hydrogen fluoride, with the molar ratio of hydrogen fluoride to olefin greater than 1 and not greater than 10, at a reaction temperature between 75 and 300° C. and a sufficient superatmospheric pressure to maintain said aqueous solution in liquid phase, for a reaction period between 5 and 15 minutes, and recovering an aliphatic alcohol so produced.

4. The process of preparing an aliphatic alcohol, which comprises subjecting a material of the class consisting of the corresponding olefin and the corresponding alkyl fluoride to the action of an aqueous solution consisting of hydrogen fluoride and an inorganic fluoride promoter selected from the group consisting of nickel fluoride, aluminum fluoride, calcium fluoride, strontium fluoride, potassium fluoborate, potassium tantalum fluoride, hydrofluoboric acid, and boron trifluoride dissolved in water, the weight of hydrogen fluoride being 10 to 50 percent by weight of the total hydrogen fluoride and water and the weight of said inorganic fluoride promoter being minor with respect to the hydrogen fluoride, with the molar ratio of hydrogen fluoride to said material greater than 1 and not greater than 10, at a reaction temperature between 75 and 300° C. and a sufficient superatmospheric pressure to maintain said aqueous solution in liquid phase, for a reaction period between 5 and 15 minutes, and recovering an aliphatic alcohol so produced.

5. The process of preparing an aliphatic alcohol, which comprises subjecting the corresponding olefin to the action of an aqueous solution consisting of hydrogen fluoride and an inorganic fluoride promoter selected from the group consisting of nickel fluoride, aluminum fluoride, calcium fluoride, strontium fluoride, potassium fluoborate, potassium tantalum fluoride, hydrofluoboric acid, and boron trifluoride dissolved in water, the weight of hydrogen fluoride being 10 to 50 per cent by weight of the total hydrogen fluoride and water and the weight of said inorganic fluoride promoter being minor with respect to the hydrogen fluoride, with the molar ratio of hydrogen fluoride to olefin greater than 1 and not greater than 10, at a reaction temperature between 75 and 300° C. for a reaction period sufficient to effect production of an alcohol, and recovering an aliphatic alcohol so produced.

6. The process of preparing an aliphatic alcohol, which comprises subjecting a material of the class consisting of the corresponding olefin and the corresponding alkyl fluoride to the action of an aqueous solution consisting of hydrogen fluoride and an inorganic fluoride promoter selected from the group consisting of nickel fluoride, aluminum fluoride, calcium fluoride, strontium fluoride, potassium fluoborate, potassium tantalum fluoride, hydrofluoboric acid, and boron trifluoride dissolved in water, the weight of hydrogen fluoride being 10 to 50 per cent by weight of the total hydrogen fluoride and water and the weight of said inorganic fluoride promoter being minor with respect to the hydrogen fluoride, with the molar ratio of hydrogen fluoride to said material greater than 1 and not greater than 10, at a reaction temperature between 75 and 300° C. for a reaction period sufficient to effect production of an alcohol, and recovering an aliphatic alcohol so produced.

7. In the process of claim 6, absorbing an olefin in concentrated hydrofluoric acid to form an alkyl fluoride-hydrofluoric acid mixture, and adding water and an inorganic fluoride promoter of said group to said mixture in amounts such that the resulting aqueous solution is as aforesaid.

8. A process for preparing an aliphatic alcohol, which comprises intimately contacting in an absorbtion reaction zone a mixture consisting of the corresponding olefin and inert diluent material with a solution consisting of hydrogen fluoride and water in which there is one part of water for from 4 to 20 parts of hydrogen fluoride, maintaining the temperature in the absorption reaction zone between 0 and 66° C. with a ratio of hydrogen fluoride to olefin by weight between 10:1 and 50:1, thereby absorbing olefin from said olefin diluent mixture into said hydrogen fluoride solution and converting said olefin to a corresponding alkyl fluoride, passing a resulting mixture of hydrogen fluoride and alkyl fluoride to a hydration zone, adding to said mixture water and an inorganic fluoride promoter selected from the group consisting of nickel fluoride, aluminum fluoride, calcium fluoride, strantium fluoride, potassium fluoborate, potassium tantalum fluoride, hydrofluoboric acid, and boron trifluoride, each being added in an amount such as the resulting solution contains hydrogen fluoride between 10 and 50 per cent by weight of the total hydrogen fluoride and water and the amount of said inorganic fluoride compound is minor with respect to the hydrogen fluoride, maintaining a reaction temperature in said hydration zone between 75 and 300° C. and a sufficient atmospheric pressure to maintain said aqueous solution in liquod phase, for a reaction period sufficient to effect production of an alcohol, and recovering an alcohol so produced.

9. The process of claim 3 wherein the olefin treated has not more than 5 carbon atoms per molecule and wherein boron trifluoride is the promotor used and is used in an amount not greater than about 13 per cent by weight of said hydrogen fluoride.

10. The process of claim 5 wherein the olefin treated has not more than 5 carbon atoms per molecule and wherein boron trifluoride is the promoter used and is used in an amount not greater than about 13 per cent by weight of said hydrogen fluoride.

FREDERICK E. FREY.

REFERENCES CITED

The following references are of record in the file of this patent:

UNITED STATES PATENTS

| Number | Name | Date |
|---|---|---|
| 1,438,123 | McElroy | Dec. 5, 1922 |
| 2,014,740 | Larson | Sept. 17, 1935 |
| 2,135,455 | Loder | Nov. 1, 1938 |
| 2,392,048 | Kassel | Jan. 1, 1946 |

FOREIGN PATENTS

| Number | Country | Date |
|---|---|---|
| 605,988 | France | June 4, 1926 |

OTHER REFERENCES

Grosse et al., "Journal of Organic Chemistry," vol. 3, pages 26–32 (1938).

Fredenhagen, "Zeitschrift fur Physikalische Chemie," vol. 164A, pages 187–200.